US012729938B2

(12) United States Patent
Guez et al.

(10) Patent No.: US 12,729,938 B2
(45) Date of Patent: Sep. 8, 2026

(54) AIR VEHICLE HAVING A PROTECTED FRONT OPTICAL ELEMENT

(71) Applicant: SAFRAN ELECTRONICS & DEFENSE, Paris (FR)

(72) Inventors: Lionel Guez, Moissy-Cramayel (FR); Thierry Hainau, Moissy-Cramayel (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 18/996,679

(22) PCT Filed: Jul. 13, 2023

(86) PCT No.: PCT/EP2023/069568
§ 371 (c)(1),
(2) Date: Jan. 17, 2025

(87) PCT Pub. No.: WO2024/017767
PCT Pub. Date: Jan. 25, 2024

(65) Prior Publication Data

US 2026/0036410 A1 Feb. 5, 2026

(30) Foreign Application Priority Data

Jul. 21, 2022 (FR) ...................................... 2207475

(51) Int. Cl.
*F42B 10/46* (2006.01)
*B64C 1/36* (2006.01)

(52) U.S. Cl.
CPC ................ *F42B 10/46* (2013.01); *B64C 1/36* (2013.01)

(58) Field of Classification Search
CPC . F42B 10/46; F42B 10/52; B64C 1/36; B64G 1/6455
See application file for complete search history.

(56) References Cited

U.S. PATENT DOCUMENTS 3,674,227 A 7/1972 Jacobson et al.
2012/0248236 A1 10/2012 Eisentraut
2017/0108319 A1* 4/2017 Boiman .................. F41G 7/008
2022/0049765 A1* 2/2022 Molesini ............. F16H 57/0479
2022/0388695 A1* 12/2022 Patty .................... B64G 1/6455

FOREIGN PATENT DOCUMENTS

CN 114 636 355 A 6/2022
EP 2633261 A1 9/2013
EP 3 396 300 A1 10/2018

* cited by examiner

*Primary Examiner* — Rodney A Bonnette
(74) *Attorney, Agent, or Firm* — MUNCY, GEISSLER, OLDS & LOWE, P.C.

(57) ABSTRACT

An aerial vehicle having a fuselage having a front portion provided with an optronic sensor and a cover for protecting the sensor, the cover being removably mounted and held on the fuselage by at least one retaining member arranged to retain the cover against aerodynamic forces exerted on the cover during flight. The aerial vehicle includes a member for deactivating the retaining member and an electronic control circuit arranged to control the deactivation member in flight to allow the cover to be ejected.

14 Claims, 2 Drawing Sheets

AIR VEHICLE HAVING A PROTECTED FRONT OPTICAL ELEMENT

The present invention relates to the field of aerial vehicles, including aerial payload carriers and, in particular, projectiles such as missiles and other guided munitions.

PRIOR ART OF THE INVENTION

Missiles are known which comprise a fuselage provided with a propulsion device and directional fins connected to an electronic guidance and navigation circuit arranged to direct the missile towards a target. The fuselage comprises a front portion (nose) provided with an optronic assembly equipped with a detector and connected to the navigation system to allow the missile to be guided towards its target when the missile is close enough to its target for it to be detected by the optronic detector.

A disadvantage of this arrangement is that the front lens of the optronic assembly is subjected to rain erosion that degrades the optical performance of the lens and therefore also of the optronic assembly.

To prevent this disadvantage, proposals have been made to produce the front lens from a material and a process which are less sensitive to rain erosion. This has not yielded any anticipated improvement in performance.

AIM OF THE INVENTION

The invention, in particular aims to provide a solution to this problem over a major part of the flight envelope of the aerial vehicle.

SUMMARY OF THE INVENTION

For this purpose, an aerial vehicle according to the invention is provided, comprising a fuselage having a front portion provided with an optronic sensor and a sensor for protecting the sensor, the cover being removably mounted and held on the fuselage by at least one retaining member arranged to retain the cover against aerodynamic forces exerted on the cover during flight, the aerial vehicle comprising a member for deactivating the retaining member and an electronic control circuit arranged to control the deactivation member in flight so as to allow the cover to be ejected.

Thus, the front lens that is behind the cover for most of the flight of the aerial vehicle is not subject to any rain erosion, and this guarantees that the expected detection performance of the sensor is maintained. In the terminal phase of flight, the cover that has been ejected no longer masks the sensor and does not alter the aerodynamic performance of the aerial vehicle (no increase in aerodynamic drag) as could have been the case if the cover remained attached to the fuselage after discovering the optronic sensor.

Other features and advantages of the invention will appear upon reading the description below of a particular and non-limiting embodiment of the invention.

BRIEF DESCRIPTION OF THE DRAWINGS

Reference will be made to the accompanying drawings, in which.

DETAILED DESCRIPTION OF THE INVENTION

Figure 1:
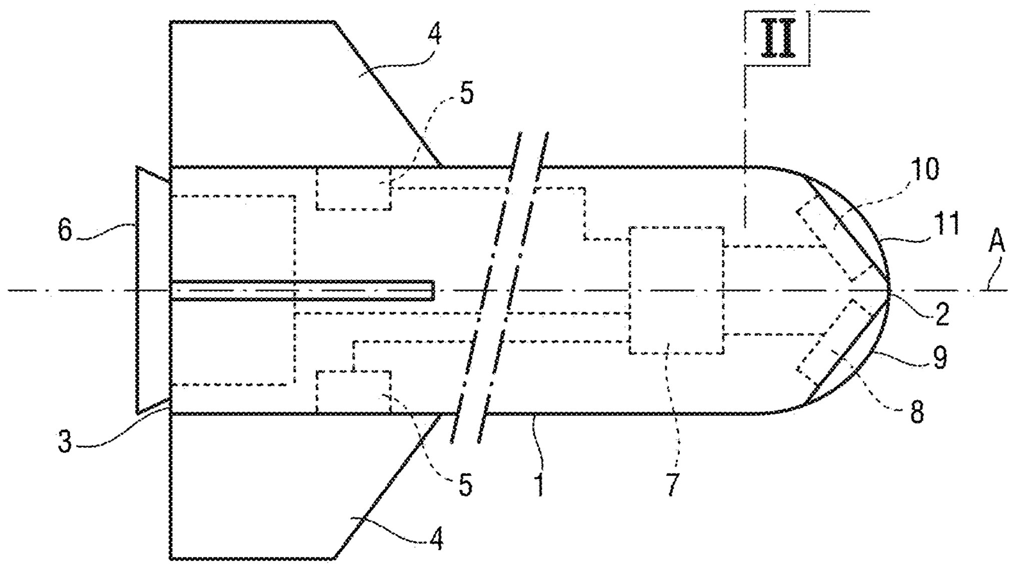
FIG. 1 is a diagrammatic elevation view of a missile of the invention.

FIG. 1 diagrammatically shows a missile comprising a generally cylindrical fuselage 1 with a front portion 2 (commonly referred to as a nose) and a rear portion 3 on either side of a non-visible central portion containing, in particular, the warhead. The rear portion 3 is provided with flight control surfaces 4 forming a tail-piece. The flight control surfaces 4 are each controllable by means of an actuator 5 such as an electric motor. The rear portion 3 also accommodates a thruster 6 such as a single or double flow reactor, a ramjet, etc. The thruster 6 and the actuators 5 are connected to an electronic guidance circuit 7 comprising, in particular, at least one processor and a memory containing a program that may be executed by the processor and arranged to guide the missile by controlling at least the actuators 5.

On the front portion 2, two optronic sensors are mounted, namely an optronic sensor 8 positioned under a lens 9 and an optronic sensor 10 arranged under a cover 11. The second sensor 8 is arranged outside the cover 11 in such a way that the cover 11 does not obstruct the operation of the sensor 8 during the entire flight phase. The optronic sensors 8 and 10 are connected to the electronic guidance circuit 7 and emit image signals used for guiding the missile, the optronic sensor 10 being, in particular, used for guiding the missile in its terminal phase of flight. In this example, the optronic sensor 10 is an infra-red detector of a missile auto-director. The guiding itself is known and it is not described in greater detail, in this case.

Figure 2:
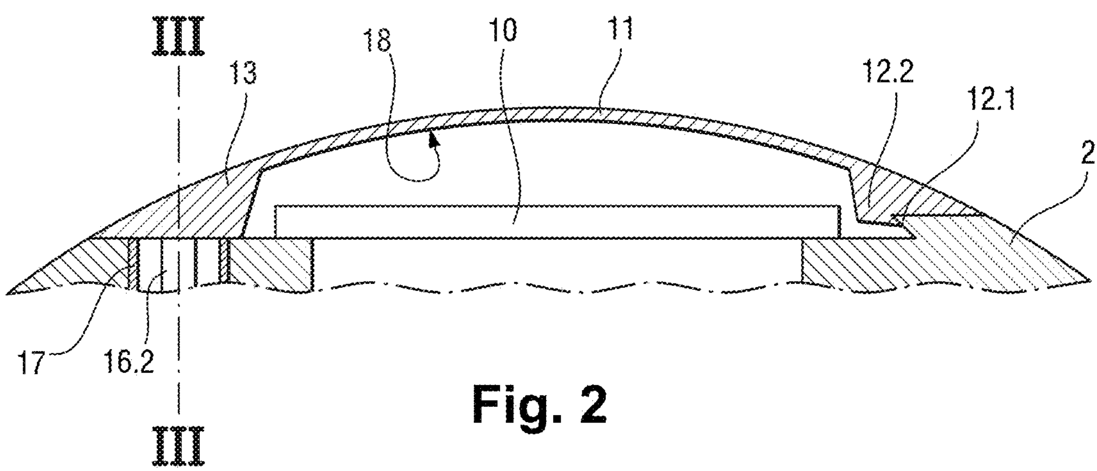
FIG. 2 is a partial enlarged view, as a cross-section along the plane II of this missile.
Figure 3:
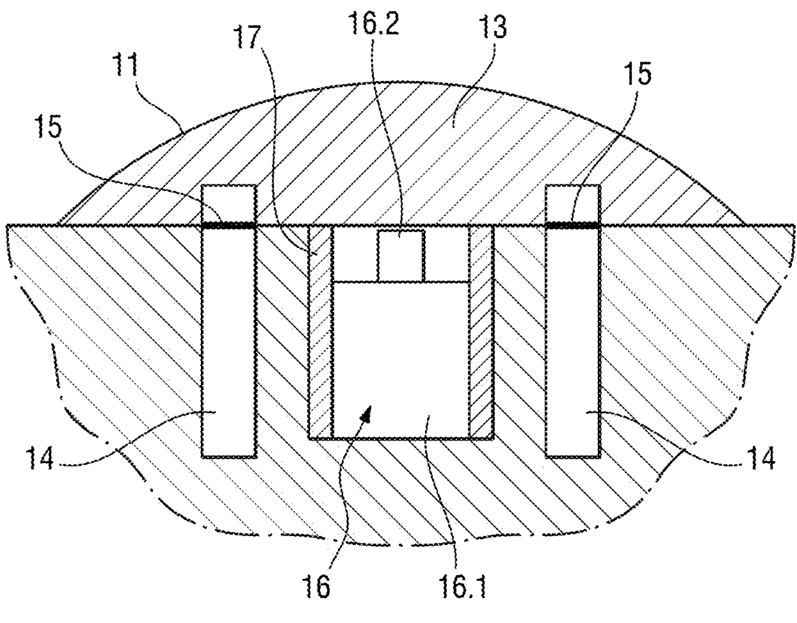
FIG. 3 is a partial view, as a section along the line III-III of FIG. 2, of the front portion of this missile.
Figure 4:
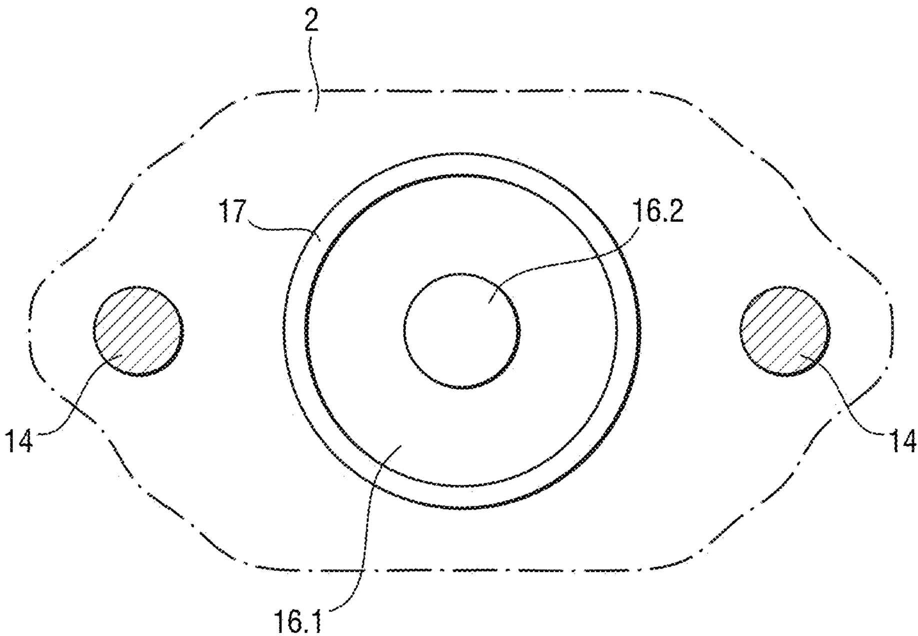
FIG. 4 is a top view, through the cover, of the pyrotechnic device and the tie rods holding the cover on the front portion of the missile.

With reference also to FIGS. 2 to 4, the cover 11 is arranged to protect the front lens of the optronic sensor 10 and is removably mounted on the front portion 2. In particular, the cover 11 protects the front lens of the optronic sensor 10 from rain erosion.

More precisely, the front portion 2 of the fuselage 1 comprises a first pivot element 12.1 about an axis transverse to a longitudinal axis A of the fuselage 1 and the cover 11 comprises a second pivot element 12.2 coming to rest against the first pivot element 12.1 in such a way that:

- the first pivot element 12.1 retains the second pivot element 12.2 as long as the cover is not ejected, and
- the second pivot element 12.2 escapes from the first pivot element 12.1 when the cover 11 is detached from the fuselage.

In this example, the first pivot element 12.1 is in the form of an edge under which the second pivot element 12.2 is engaged, which in turn is in the form of an edge complementary to that of the first pivot element 12.1.

This pivot element may also be made using an attachment or any other mechanical element sized in such a way that it may break or separate after the cover is detached 11.

A portion 13 of the cover 11 is held on the front portion 2 of the fuselage 1 by at least one retaining member arranged to retain the portion 13 and therefore the cover 11 against aerodynamic forces exerted on the cover 11 during the flight of the missile.

In this example, there are two retaining members, each in the form of a tie rod 14 having one end fixed to the front portion 2 and one end fixed to the portion 13 of the cover 11. Between both of these ends, each tie rod 12 comprises an incipient fracture 15, in this case, a groove forming a cross-sectional restriction extending over the tie rod 12 substantially in a joint plane between the front portion 2 and the cover 11.

Between both tie rods 14 extends a pyrotechnic member 16 comprising a body 16.1 secured to the front portion 2 and a piston 16.2 that is movable relative to the body 16.1 from a retracted position to an extended position under the action of a pyrotechnic charge contained in the body 16.1. The pyrotechnic member 16 is surrounded, at least partially, by a containment wall 17 arranged to prevent the bursting of the pyrotechnic charge from degrading the structure and the operation of the other sub-assemblies of the missile. The containment wall is also preferably thermally insulated. The pyrotechnic member 16 is arranged to exert a force on the portion 13 of the cover 11 greater than a maximum retaining force exerted by the tie rods 14 on the cover 11. Such a pyrotechnic member is known per se. In this example, the piston 16.2 and the tie rods 14 have central axes located in the same plane. The tie rods 14 are thus arranged in alignment with the thrust point of the piston 16.2 on the portion 13 and this thrust point is diametrically opposite the pivot elements 12.1, 12.2.

The pyrotechnic member 16 is connected to the electronic guidance circuit 7 and forms a member for deactivating the retention of the cover 11: the pyrotechnic member 16 is in fact arranged and sized to exert a thrust on the cover 11 that is sufficient to break the tie rods 14 at the incipient rupture 15.

The electronic guidance circuit 7 is arranged to control the pyrotechnic member 16 in flight in such a way as to allow the cover 11 to be ejected, a portion of the aerodynamic flow rushing in under the portion 13 detached from the fuselage by the piston 16.2 and raising the cover 11. The electronic guidance circuit 7 comprises means for detecting the beginning of a terminal phase of flight of the missile and is arranged to control the pyrotechnic member 16 and the deactivation of the retaining means once the terminal phase of flight has begun: the optronic sensor 10 is then exposed and may perform its image transmission function for the terminal guidance of the missile. The detection of the beginning of the terminal phase of flight of the missile is obtained, for example, by measuring the duration of the flight by considering that the terminal phase of flight takes place after a predetermined flight time, or according to a GNSS position if the missile embeds a signal receiver from satellites of a global satellite navigation system, etc.).

It should be noted that the pyrotechnic member 16 is sized to allow the tie rods 14 to break and the cover 11 to be ejected while the cover 11 is subjected to aerodynamic pressure, and optionally, the missile undergoes shocks, vibrations, linear and angular accelerations, regardless of the climatic conditions (in particular, the presence of freezing, frost or ice).

To facilitate the ejection of the cover 11, the electronic guidance circuit may be arranged to orientate the missile in a position that enhances the action of the aerodynamic flow, for example, by controlling a rolling motion of the missile.

Preferably, the cover 11 comprises, facing the optronic sensor 10, a uniform internal surface 18 and the electronic guidance circuit 7 is arranged to calibrate the optronic sensor 10 before the cover 11 is ejected. Such a calibration, known per se, makes it possible to improve the performance of the optoelectronic sensor 10 during its operational service life. The entire internal surface of the cover 11 may be uniform or only the portion of the internal surface covered by the field of the optronic sensor 10 used for the calibration.

It should also be noted that the cover 11 has a limited volume, preferably at most, to extend just above the optronic sensor 10 (i.e., as close as possible to the optronic sensor 10, considering the manufacturing, assembly and operating clearances) in such a way that the profile of the missile after the cover is ejected 11 is very close to the profile of the missile before the cover is ejected 11 and does not significantly alter the aerodynamic behaviour of the aerial vehicle after the cover is ejected. This limited volume results in a limited mass such that the ejection of the cover 11 does not lead to an alteration of the overall mass of the missile and also of the distribution of the masses in the latter that is detrimental to controlling the missile. The control of the missile is either not altered or only slightly altered by the ejection of the cover 11. Advantageously, the front portion of the missile will also be arranged under the cover so that the aerodynamic profile of the missile remains substantially the same before and after ejecting the cover.

This concept provides a safety device making it possible to prevent the cover 11 from being ejected when the missile if being handled. By way of example, this device comprises a contact cut-off preventing the pyrotechnic member from being activated and a mechanical element opposing the ejection of the cover 11, such as a pin or another mechanical system.

Naturally, the invention is not limited to the embodiment described, but covers any variation falling within the scope of the invention as defined by the claims.

In particular, the aerial vehicle may be of a structure different from that described.

The pyrotechnic member and the pivot point are not essential. The front portion of the fuselage may be in the form of a flat face inclined relative to the longitudinal axis of the fuselage in such a way that, when the retaining members are deactivated, the cover slides on the flat face under air pressure before being ejected rearwards.

It is possible to provide a retaining member in two opposite parts of the cover and a pyrotechnic member associated with it.

Instead of a pyrotechnic member, it is possible to use a mechanical device capable of releasing the energy required to eject the cover. The energy required to eject the cover 11 is preferably transmitted either by the pyrotechnic member 16 or any other mechanical system having an energy reserve.

The tie rods may be weakened to limit the pyrotechnic charge. It is also possible to weaken at least one of the attachment points of the tie rod.

It is also possible to provide weakened areas directly integrated into the cover which break under the effect of the actuator and thus replace the tie rods with standard attachment systems. For holding the cover on the aerial vehicle, instead of tie rods or screws, it is possible to use any other retaining device such as clips, pins or toggle joints, locking holding systems may be envisaged, for example, a lock engaged in a keeper in the cover and controlled by an actuator. The aerial vehicle may comprise a plurality of electronic circuits arranged at various locations in the fuselage to each perform one or more functions and connected so as to form an electronic guidance circuit as described above.

In this case, the term ‘fuselage’ is used in the broad sense to designate both the external envelope of the missile and also the internal structure/armature of the latter.

The tie rod 14 may be broken either at either the tie rod itself or at the weakened areas arranged in the cover 11.

The pivot element may also be made using an attachment or any other mechanical element sized in such a way that it may break or separate after the cover is detached 11.

Preferably, the control module is arranged to orientate the aerial vehicle in the terminal phase of flight of the aerial vehicle so as to benefit from the aerodynamic forces involved in ejecting the cover 11. Thus, when the pyrotechnic member is actuated, the cover 11 is at least partially detached from the fuselage on the front of the latter: the missile is then orientated so that the relative airflow rushes in between the cover 11 and the fuselage to assist the ejection of the cover 11. This may be achieved by a rolling motion or by a drifting motion depending on the orientation of the raised portion relative to the advancing direction of the missile.

The invention claimed is:

1. An aerial vehicle comprising:

a fuselage having a front portion provided with an optronic sensor;

a cover for protecting the optronic sensor, the cover being removably mounted and held on the fuselage by at least one retaining member arranged to retain the cover against aerodynamic forces exerted on the cover during flight, the cover comprising, facing the optronic sensor, a uniform internal surface making it possible to calibrate the optronic sensor before the cover is ejected;

a deactivation member for deactivating the retaining member; and an electronic control circuit arranged to control the deactivation member in flight so as to allow the cover to be ejected.

2. The aerial vehicle according to claim 1, wherein the retaining member is a tie rod and the deactivation member is a pyrotechnic member arranged and sized so as to break the tie rod.

3. The aerial vehicle according to claim 2, wherein the tie rod may be broken either at the tie rod itself or at weakened areas arranged in the cover.

4. The aerial vehicle according to claim 2, wherein the tie rod and the pyrotechnic member are arranged in proximity so as to optimise the energy efficiency of the pyrotechnic member on the cover.

5. The aerial vehicle according to claim 2, wherein the pyrotechnic member is surrounded, at least partially, by a containment wall.

6. The aerial vehicle according to claim 2, wherein the pyrotechnic member is arranged to exert on the cover a force greater than the combination of a maximum retaining force exerted by the tie rod on the cover and the external environmental forces.

7. The aerial vehicle according to claim 1, wherein the energy required to eject the cover is transmitted either by the pyrotechnic member or by any other mechanical system having an energy reserve and capable of releasing the energy required to eject the cover.

8. The aerial vehicle according to claim 1, wherein the cover is arranged so as to benefit from the aerodynamic forces involved in its ejection.

9. The aerial vehicle according to claim 1, wherein the fuselage comprises a first pivot element about an axis transverse to a longitudinal axis of the fuselage and the cover comprises a second pivot element coming to rest against the first pivot element in such a way that:

the first pivot element retains the second pivot element as long as the cover has a portion opposite the pivot elements held applied against the fuselage, and the second pivot element escapes from the first pivot element when said portion of the cover is detached from the fuselage.

10. The aerial vehicle according to claim 9, wherein the first pivot element may also be made using an attachment or any other mechanical element sized in such a way that it may break or separate after the cover is detached.

11. The aerial vehicle according to claim 1, wherein the cover has a limited volume to extend just above the optronic sensor.

12. The aerial vehicle according to claim 1, further comprising at least one second sensor arranged outside the cover and the protection of the optronic sensor with said cover in such a way that the cover does not obstruct the operation of the second sensor throughout the entire flight phase.

13. An aerial vehicle comprising:

a fuselage having a front portion provided with an optronic sensor;

a cover for protecting the optronic sensor, the cover being removably mounted and held on the fuselage by at least one retaining member arranged to retain the cover against aerodynamic forces exerted on the cover during flight, the cover comprising, facing the sensor, a uniform internal surface making it possible to calibrate the sensor before the cover is ejected;

a deactivation member for deactivating the retaining member; and an electronic control circuit arranged to control the deactivation member in flight so as to allow the cover to be ejected, wherein the electronic control circuit is arranged to orientate the aerial vehicle in the terminal phase of flight of the aerial vehicle so as to benefit from the aerodynamic forces involved in ejecting the cover.

14. An aerial vehicle comprising:

a fuselage having a front portion provided with an optronic sensor;

a cover for protecting the optronic sensor, the cover being removably mounted and held on the fuselage by at least one retaining member arranged to retain the cover against aerodynamic forces exerted on the cover during flight, the cover comprising, facing the sensor, a uniform internal surface making it possible to calibrate the sensor before the cover is ejected;

a deactivation member for deactivating the retaining member; and an electronic control circuit arranged to control the deactivation member in flight so as to allow the cover to be ejected, wherein the electronic control circuit is arranged to calibrate the optronic sensor before the cover is ejected.

* * * * *